Figure 1:
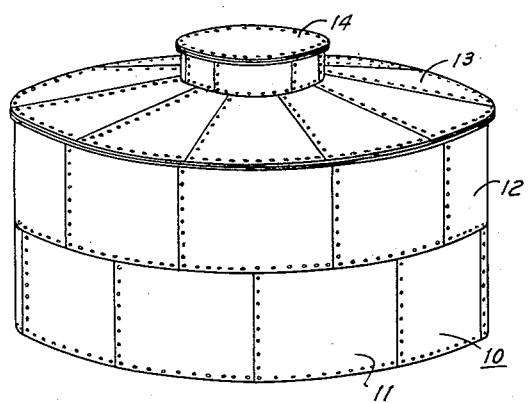

May 13, 1958  J. F. GIBB  2,834,702

REINFORCED SYNTHETIC RESIN SHEETS

Filed Aug. 15, 1955

INVENTOR
John F. Gibb

BY Ashley & Ashley

ATTORNEYS

United States Patent Office 2,834,702
Patented May 13, 1958

2,834,702

REINFORCED SYNTHETIC RESIN SHEETS

John F. Gibb, Tulsa, Okla., assignor to National Tank Company, Tulsa, Okla., a corporation of Nevada Application August 15, 1955, Serial No. 528,335

6 Claims. (Cl. 154—43)

This invention relates to new and useful improvements in reinforced synthetic resin sheets and methods of forming the same.

The invention is particularly concerned with new and useful improvements in plates for tanks or other fluid-containing enclosures wherein such plates are formed of a reinforced synthetic resin.

In the construction of a corrosion-resistant, or corrosion-proof, storage tank or other fluid-containing enclosure, as for instance, an oil field tank for the storage or retention of a corrosive petroleum or corrosive water, the use of reinforced, synthetic resin panels or plates for fabrication of the tank staves has resulted in the creation of several problems. In order that the plate or stave have sufficient tensile strength, it must contain a quite high percentage of reinforcing fibers, such as glass fibers, and for purposes of cost reduction, the resin content of the plate must be kept at a minimum. In effect, the glass fibers are employed as the strength-producing or structural element, and the resin is utilized merely to close the spaces or voids between the glass fibers and render the plate impervious to the passage of fluids. Good results have been obtained in this direction, but it has been discovered that the plates tend to develop porosity or permeability prior to the time the vessel or enclosure is ultimately put into use as a storage enclosure, or even subsequent to such initiation of use.

The reinforced resin plates undergo considerable temperature changes during fabrication, they must be handled extensively during fabrication, during shipment to the point of use, and during assembly or erection of the completed tank or vessel. Apparently, a major portion of the porosity or permeability of the plates is caused or comes into existence during this latter period.

To obtain the desired concentration of glass fibers and the resultant directional tensile strength of the resinous plates, it is desirable, if not essential, to utilize glass fiber rovings laid in parallel and closely spaced relationship to form a reinforcing layer. These rovings consist of elongate, very fine, glass fibers oriented in the same direction and loosely twisted into a yarn, a plurality of these yarns being alined and loosely twisted together to form a roving. The resultant structure is in the form of an elongate, small diameter cylinder in which the individual glass fibers and yarns are somewhat loosely associated. Since the major stress upon a tank stave extends circumferentially of the tank, or in a "hoop-wise" direction, it is desirable to provide two or more layers of reinforcing rovings extending in a hoop-wise direction, and possibly only one layer of such rovings extending vertically of the plates when the same are assembled into the tank or enclosure.

When assembled into a layer in side by side relationship, the layer of rovings resembles, on a very reduced scale, a plurality of tubes or pipes lying side by side and abutting one another tangentially. Obviously, there is an approximately triangular space on each side of the layer between each pair of the rovings. In the finished plate, this space is filled with a synthetic resin.

It is believed that porosity of the plates results from the unavoidable flexing thereof after fabrication and during shipment or erection into a completed tank. Obviously, the reinforcing layers have virtually no tensile strength transversely to the longitudinal axis of the rovings, and cracking of the resin between adjacent rovings may occur. If it is attempted to strengthen the plate by additional layers of rovings extending in a direction to resist cracking, one still ends up with unidirectional layers subject to cracking either vertically or hoop-wise of the tank plates, and the problem is not solved in this manner. It has been discovered, however, that an impervious barrier member may be incorporated into the plate by inclusion therein of a layer of rubber-like material which is flexible and resistant to cracking, and which functions to prevent the passage or seeping of fluids through the wall of the vessel. It has also been discovered that relatively thin glass fiber cloth, or very small diameter glass fiber rovings may be incorporated into the reinforced synthetic resin plate in such a manner that the predominant portion of the glass fibers resist the flexing which causes cracking between adjacent ones of the larger reinforcing rovings.

It is, therefore, one object of this invention to provide an improved reinforced, synthetic resin plate or sheet, and a method of producing the same, for use in a tank or fluid enclosure which is highly resistant to cracking due to flexing, and which retains its impervious and impermeable nature during erection and in use in the vessel or enclosure.

A particular object of the invention is to provide an improved product of the character described which includes as an inner layer a rubber-like membrane which effectively resists cracking or becoming porous due to flexing.

Another particular object of the invention is to provide an improved method of producing or fabricating a product of the character described.

A further particular object of the invention is to provide a product of the character described in which reinforcing fibers are introduced selectively to resist cracking of the resin within the major reinforcing layers.

A construction designed to carry out the invention will be hereinafter described together with other features of the invention.

Figure 4:
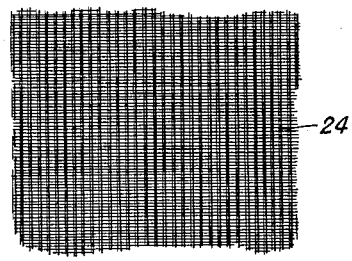
Figure 2:
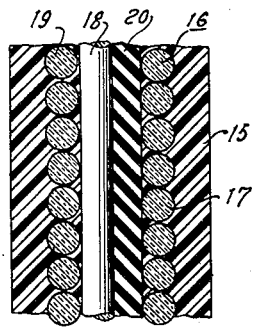
Figure 5:
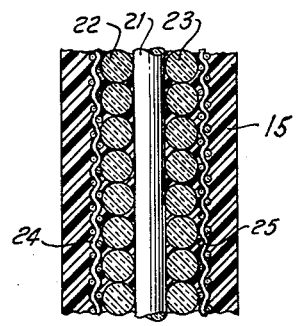
Figure 6:
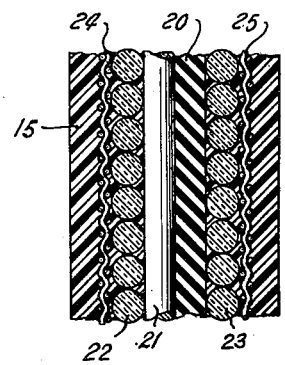
Figure 3:
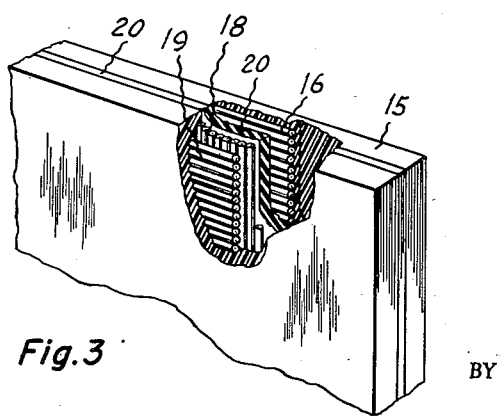

The invention will be more readily understood from a reading of the following specification and by reference to the accompanying drawing, wherein examples of the invention are shown, and wherein:

Fig. 1 is a perspective view of a typical storage tank or vessel fabricated of a plurality of reinforced, synthetic resin plates constructed in accordance with this invention, and resulting from the methods hereof, Fig. 2 is an enlarged, fragmentary, vertical sectional view through one of the plates of the tank of Fig. 1, Fig. 3 is a fragmentary, perspective view, partly broken away, of the plate structure of Fig. 2 and showing the arrangement of the component portions thereof, Fig. 4 is a fragmentary plan view of a type of thin, unidirectional, glass cloth reinforcing material as utilized in this invention, Fig. 5 is a vertical, cross-sectional view of a modified form of the plate structure utilizing the reinforcing material of Fig. 4, and Fig. 6 is a view similar to Fig. 5 and showing a further modification of the invention wherein both the rubber-like layer and the additional reinforcing layers are employed.

In the drawings, the numeral 10 designates a conventional storage tank or vessel formed of a plurality of rectangular plates 11 joined together in end-wise relationship and extending circumferentially of the tank. Additional courses of staves 12 may have their lower edges curved to the upper edges of the plates 11 as required to provide a vessel of the desired height and volume. A roof or deck 13 and closure dome 14 is provided in the usual manner.

It will be understood that the major stresses applied to the plates 11 and 12 will be in the circumferential or hoop-wise direction, and accordingly, when reinforced, synthetic resin plates are employed for fabrication of the tank 10, a major portion of the reinforcing material should extend in the hoop-wise dimension of the plates. As shown in Fig. 2, the plate may consist of cured synthetic resin 15 having embedded therein, a first layer 16 of reinforcing fibers, such as the glass fiber rovings 17 illustrated, the rovings extending circumferentially or hoop-wise of the tank 10 when the plates are assembled thereinto. A second layer of reinforcing fibers, such as glass fiber rovings 18, is provided outwardly of the layer 16, the rovings 18 extending vertically to provide tensile strength in that direction. A third layer of reinforcing fibers, such as the glass fiber rovings 19, is provided outwardly of the layer 18, the rovings 19 again extending in a circumferential direction. For purposes of illustration, the thickness of the resin layer has been greatly exaggerated, and it is pointed out, that the resin normally extends only slightly outwardly of the reinforcing fibers whereby the fibers occupy or constitute the major portion of the plate structure.

The glass fiber rovings may be individually laid into a reinforcing layer, that is, the individual rovings may be alined in parallel abutting relationship without physical attachment, impregnated with the resin, and superposed into the relationship shown for enclosure in a heated press for the application of heat and pressure to form the finished plate. In the alternative, unidirectional glass cloth may be employed, this material consisting of parallel substantially abutting, relatively large glass rovings joined together loosely by a relatively small number of small transverse glass fiber yarns or rovings to prevent disarrangement of the larger glass rovings from their parallel abutting relationship. In such unidirectional cloth, by far the major portion of the glass fibers are still oriented in one plane and in one direction and the ability to concentrate in one plane and in one direction the available tensile strength of the glass fibers is retained.

In either instance, however, the individual layers of glass rovings, 16, 18, and 19, have very little resistance to tensile stresses applied transversely to the rovings, and the resin present between the rovings in the finished plate may be cracked by a flexing of the plate during handling, transportation, and the like. Accordingly, small crevices or interstices may develop in the several layers of rovings, and through capillary action, or direct conduction, seepage of fluid through the finished plate may result.

In the form of the invention shown in Fig. 2, there is incorporated into the plate a layer 20 of a rubber-like material which is resistant to cracking through flexure and which thus insures retention of the nonporosity of the finished plate. Since the layer 20 is introduced during the assembly of the several layers of reinforcing layers and is subjected to the heat and pressure of the resin curing press, as well as for the purpose of obtaining an effective and permanent bond between layer 20 and the layers of rovings on either side thereof which also necessitates heating of the layer 20 within the fabricating press, it is desirable that the rubber or rubber-like material of which the layer 20 is constituted be in an uncured, semi-cured, or at least less than completely cured condition. Subsequently, when the layer is subjected to the heat and pressure of the fabricating press, as well as during any post curing of the resin which may be carried out, a complete curing of the layer 20 will occur, and possible overcuring of the layer 20 will be avoided.

Any of the natural or synthetic rubbers may be utilized for the layer 20, neoprene and the buna rubbers having been found very satisfactory. It is desirable to employ an epoxy resin for the resin 15, and such resin bonds very securely and readily to neoprene and similar synthetic resins. The resultant plates have been subjected to extremely severe flexure tests without developing any porosity or permeability.

The cracking of the resin between adjacent ones of the rovings in any one of the reinforcing layers may also be prevented by selective reinforcing of the plate with thin or small diameter reinforcing cloth or fibers extending transversely to the rovings in the major reinforcing layers. Thus, as shown in Fig. 5, the plate may include a central layer of rovings 21 extending vertically of the plate and abutted on each side with horizontally extending layers of reinforcing rovings 22 and 23, respectively. Outwardly of the layers 22 and 23 there are provided supplementary reinforcing layers, 24 and 25, respectively, the supplementary layers consisting of small diameter yarns or rovings extending vertically of the plate, or more desirably, of thin, unidirectional, glass fiber cloth, as shown in Fig. 4, and having by far the major portion of its glass fibers extending in parallel unidirectional relationship and oriented vertically of the plate. The spacing of the vertical fibers in the layers 24 and 25 in relation to the diameters thereof, is not sufficient to permit the inclusion of any large triangular shaped bodies of resin between said fibers, and hence, no tendency for vertical cracking of the resin between vertical fibers of the layers 24 and 25 is encountered. The concentration of the vertical fibers in the layers 24 and 25 has the beneficial result, however, of reinforcing the plate immediately outwardly of the layers 22 and 23 and effectively resisting the tendency of the resin to crack parallel to the rovings of the layers 22 and 23 and result in crevices or interstices extending parallel to and between rovings of said layers. In addition, the inclusion of the layers 24 and 25 has been found to result in a tank plate of greater rigidity than that which results when said layers are omitted even though the overall increase in tensile strength, both vertically and horizontally, of the plate is not extensively affected.

Because of the fineness, or relatively small diameter, of the reinforcing fibers which are oriented vertically in the layers 24 and 25 and positioned immediately outwardly of the layers 22 and 23, it is quite difficult to handle such yarns or fibers as individual strands. Accordingly, it is preferable to utilize the unidirectional glass fiber cloth described, and illustrated in Fig. 4.

A third form of the invention is shown in Fig. 6 and comprises a combination of the forms of Fig. 2 and Fig. 5. Thus, both the inner, impervious, rubber-like layer 20 may be employed along with the outer, supplementary layers of reinforcing fiber 24 and 25. This structure combines the features and advantages of both of the previously described modifications and provides double assurance of plate rigidity and resistance to the development of porosity or fluid leaks.

The layer 20 may be relatively thin, and desirably may consist of uncured or semi-cured neoprene $\frac{1}{32}$ of an inch thick, or even as thin as $\frac{22}{1000}$ of an inch. Appreciably thinner layers of the rubber-like material are not as desirable, and thicker layers are not required and represent only an unnecessary expenditure for the neoprene or rubber-like material.

When resins such as the epoxy resins are employed, there is no necessity for bonding the resin to the layer 20, it being an inherent quality of this resin to provide a very effective and permanent bond to materials of this type. A bonding layer of any suitable adhesive material may be employed, however, if found desirable or necessary, such bonding materials varying in accordance with the nature of the layer 20 as well as with the nature of the synthetic resin being employed, but being well known in this art.

All three forms of the invention have been subjected to very severe flexing tests, followed by continued application of fluid under high pressure transversely of the plate under test, and in each instance, complete resistance to the passage of fluid has been observed. Similar plates, without either the inner layer 20 or the supplementary reinforcing layers 20 and 24 have been subjected to the same test procedures, and invariably have exhibited porosity and fluid passage at relatively low test pressures.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A reinforced synthetic resin wall member for liquid-containing enclosures, including, a sheet of hardened synthetic resin, at least two main reinforcing layers embedded in said sheet, each main reinforcing layer comprising a plurality of parallel substantially-abutting relatively large diameter rovings of reinforcing glass fibers disposed in a single layer over the area of the sheet, and supplementary reinforcing layers embedded in the sheet outwardly of the main reinforcing layers, said supplementary reinforcing layers comprising a multiplicity of reinforcing glass fibers arranged in small diameter yarns and extending primarily transversely to the rovings of the main reinforcing layers.

2. A storage tank for the retention of corrosive liquids wherein the staves of the tank are constructed in accordance with claim 1.

3. A reinforced synthetic resin wall member for liquid-containing enclosures, including, a sheet of hardened synthetic resin, at least two main reinforcing layers embedded in said sheet, each main reinforcing layer comprising a plurality of parallel substantially-abutting relatively large diameter rovings of reinforcing fibers disposed in a single layer over the area of the sheet, and supplementary reinforcing layers embedded in the sheet outwardly of the main reinforcing layers, said supplementary reinforcing layers comprising a multiplicity of parallel substantially-abutting relatively small diameter yarns of reinforcing fibers extending transversely to the rovings of the main reinforcing layers.

4. A reinforced synthetic resin wall member for liquid-containing enclosures, including, a sheet of hardened synthetic resin, at least two main reinforcing layers embedded in said sheet, each main reinforcing layer comprising a plurality of parallel substantially-abutting relatively large diameter rovings of reinforcing fibers disposed in a single layer over the area of the sheet, the rovings of one of the main reinforcing layers extending transversely to the rovings of the other main reinforcing layer, and supplementary reinforcing layers embedded in the sheet outwardly of the main reinforcing layers, said supplementary reinforcing layers comprising a multiplicity of parallel substantially-abutting small diameter yarns of reinforcing fibers disposed in a single layer over the area of the sheet, and each of the supplementary reinforcing layers having its yarns extending transversely of the rovings of the main reinforcing layer outwardly of which said supplementary reinforcing layer is disposed.

5. A reinforced synthetic resin wall member for liquid-containing enclosures, including, a sheet of hardened synthetic resin, at least two main reinforcing layers embedded in said sheet, each main reinforcing layer comprising a plurality of parallel substantially-abutting large diameter rovings of reinforcing fibers disposed in a single layer over the area of the sheet, the rovings of at least one of the main reinforcing layers extending transversely to the rovings of at least one other of the main reinforcing layers, and supplementary reinforcing layers embedded in the sheet outwardly of the main reinforcing layers, said supplementary reinforcing layers comprising unidirectional cloth formed of a multiplicity of parallel substantially-abutting small diameter yarns of reinforcing fibers joined by a relatively few small diameter yarns of reinforcing fibers extending transversely thereto, the multiplicity of reinforcing fibers of the supplementary layers extending transversely to the rovings of the main reinforcing layer outwardly of which said supplementary layer is disposed.

6. A reinforced synthetic resin wall member for liquid-containing enclosures, including, a sheet of hardened synthetic resin, at least two main reinforcing layers embedded in said sheet, each main reinforcing layer comprising a plurality of parallel substantially-abutting large diameter rovings of reinforcing fibers disposed in a single layer over the area of the sheet, the rovings of at least one of the main reinforcing layers extending transversely to the rovings of at least one other of the main reinforcing layers, and a supplementary reinforcing layer embedded in the sheet outwardly of each of the outermost main reinforcing layers, said supplementary reinforcing layers comprising unidirectional cloth formed of a multiplicity of parallel substantially-abutting small diameter yarns of reinforcing fibers joined by a relatively few small diameter yarns of reinforcing fibers extending transversely thereto, the multiplicity of reinforcing fibers of the supplementary layers extending transversely to the rovings of the main reinforcing layer outwardly of which said supplementary layer is disposed.

References Cited in the file of this patent

UNITED STATES PATENTS

| | | |
|---|---|---|
| 2,322,771 | Palm et al. | June 29, 1943 |
| 2,440,965 | Merrill et al. | May 4, 1948 |
| 2,477,407 | Grant et al. | July 26, 1949 |
| 2,562,951 | Rose et al. | Aug. 7, 1951 |
| 2,574,221 | Modigliani | Nov. 6, 1951 |
| 2,594,693 | Smith | Apr. 29, 1952 |
| 2,596,184 | Sutton | May 13, 1952 |
| 2,680,700 | Meyer | June 8, 1954 |
| 2,705,166 | Gurney | Apr. 12, 1955 |
| 2,713,549 | Reid et al. | July 19, 1955 |